Figure 1:
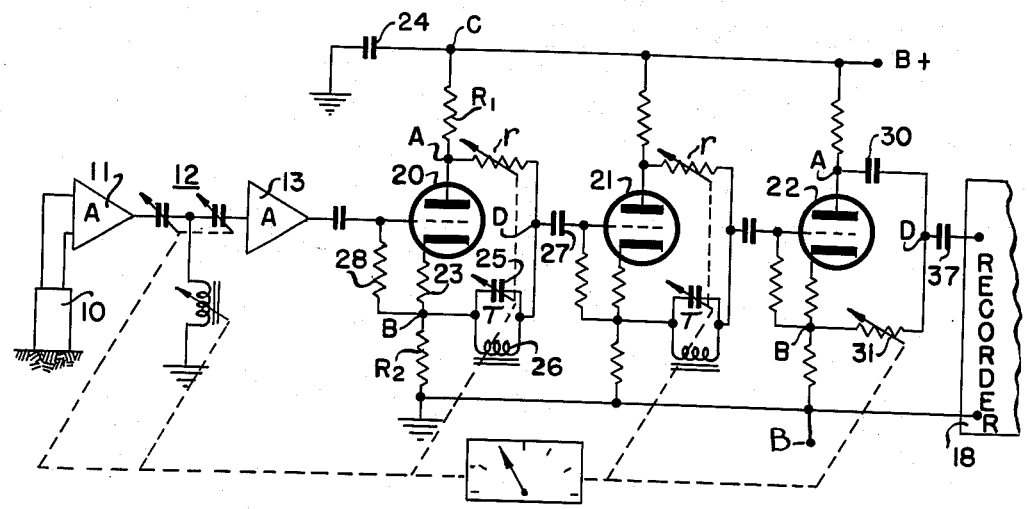

WILLIAM B. HEMPHILL
INVENTOR.

Nov. 29, 1955 W. B. HEMPHILL 2,725,534
RECORDING SEISMIC WAVES WITHOUT PHASE DISTORTION
Filed March 8, 1951 3 Sheets-Sheet 2

WILLIAM B. HEMPHILL
*INVENTOR.*

BY D. Carl Richards
*AGENT*

WILLIAM B. HEMPHILL
INVENTOR.

BY D. Carl Richards
AGENT

# United States Patent Office 2,725,534
Patented Nov. 29, 1955

2,725,534
RECORDING SEISMIC WAVES WITHOUT PHASE DISTORTION

William B. Hemphill, Dallas, Tex., assignor, by mesne assignments, to Mobil Oil Company, Inc., a corporation of New York Application March 8, 1951, Serial No. 214,553

12 Claims. (Cl. 333—28)

This invention relates to geophysical exploration and, more particularly, to an improvement in seismic recording in which selected signal frequencies are recorded in an undisturbed phase relation with respect to the detected seismic signal.

In seismic exploration, seismic waves generated upon detonation of an explosive charge are detected, amplified and recorded as a means for determining the depth and the character of sub-surface formations. The frequency components comprising the signal ultimately recorded vary depending upon many factors related to the explosion, to the character of the earth between the shot point and detecting station, and to the instruments employed for detecting, amplifying and recording them. It is customary to employ a filter for selecting certain frequency components and for eliminating other components in order to record the selected frequencies free of noise and other extraneous signals that otherwise make difficult a reliable interpretation of the records. It is well understood by those skilled in the art that filters having variable selectivity have associated therewith a phase-frequency response which is non-linear, particularly at regions in the frequency spectrum where the amplitude selectivity is sharp. Such non-linear response produces phase distortion.

Prior art systems have attempted to provide a solution for eliminating phase distortion. In one case, a filter is provided in which the cut-off frequencies have a particular relation with respect to band width and the center frequency of the band has been shown to have a phase response such that it is thus free of distortion within the pass band. In other prior art systems, there have been attempts made to correct the phase response not only for distortion introduced by the filter in the amplifying channel but also to correct distortion due to the passage of the seismic signals through the earth itself.

There are inherent difficulties in such prior art systems. In the former case, band widths may not be selected independently of the position of the band in the seismic spectrum and in the latter case, it is difficult to determine the distortion produced by the earth in order to correct for it.

By the present invention there is provided a system in which the frequency components of a seismic signal actuating a seismometer are converted into electrical signals and subsequently recorded in an undisturbed time relation. At the same time the desired amplitude-frequency response of the system is obtained. Further, the amplitude-frequency response may be readily varied with the phase-frequency response at all times of such nature that there is no phase distortion in the signal channel extending from detector to recorder inclusive.

More particularly, there is provided a signal channel having input terminals and output terminals with circuit elements between the terminals defining the filter for transmission of selected signal frequencies and for rejection of other frequencies. Additional circuit means are provided between the terminals resonant at a selected frequency within the range of frequencies transmitted by the filter for modifying the phase-frequency response of the channel by a selected increment at the resonant frequency. Means associated with the resonant circuit determines the rate of variation of the increment at frequencies adjacent the resonant frequency for selectively modifying the phase response of the channel while maintaining substantially constant the amplitude response as determined by the filter. There is further provided circuit means between the terminals for uniformly modifying the phase response for each frequency throughout the pass band to adjust the point at which an extension of the phase-frequency response intercepts a zero-frequency point. As a result there may be provided the desired amplitude response together with a phase-frequency response that is linear through the pass band of the filter and which has a zero frequency intercept that is an integral multiple of $\pi$.

Figure 2:
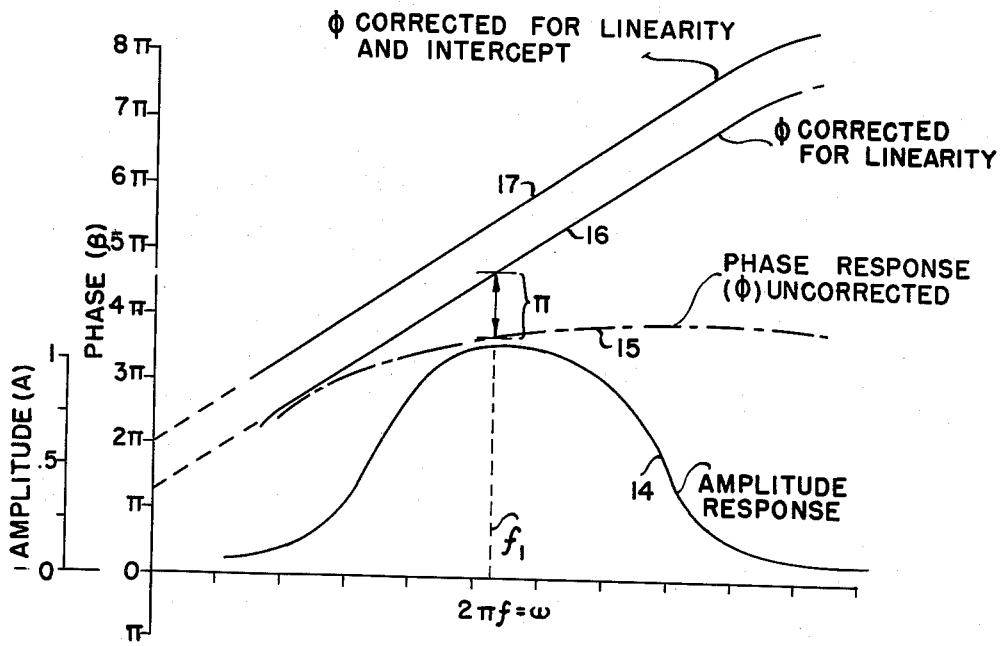
Figure 3:
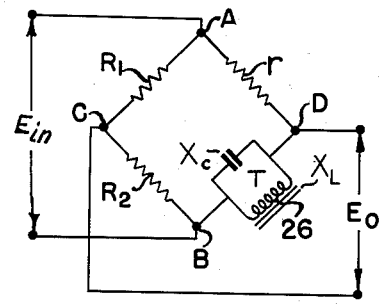
Figure 6:
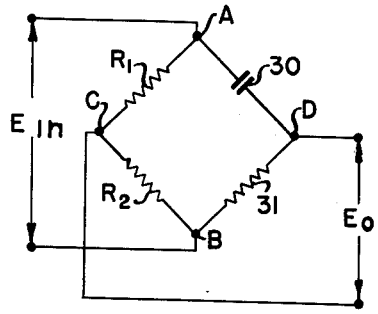
Figure 4:
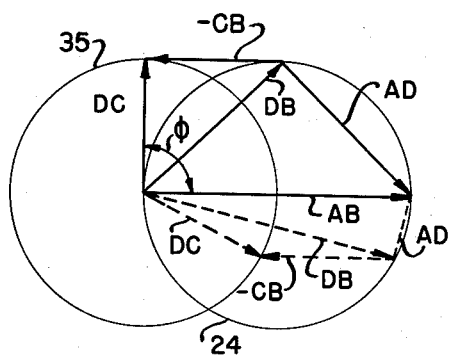
Figure 7:
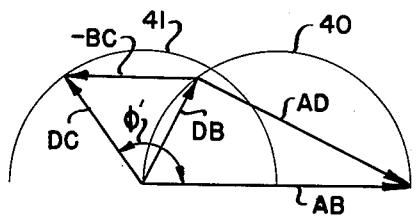
Figure 5:
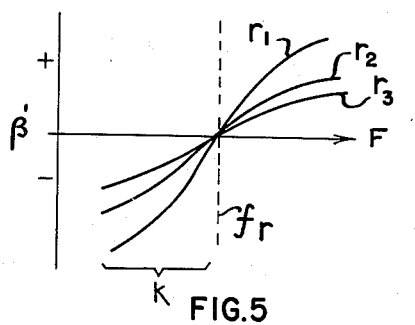
Figure 8:
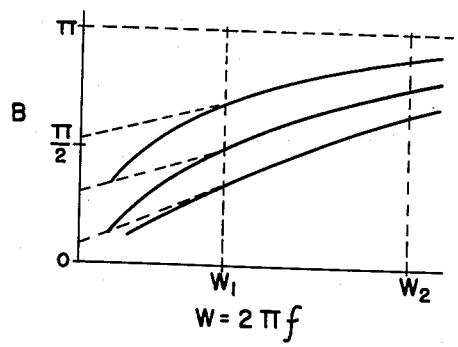
Figure 9:
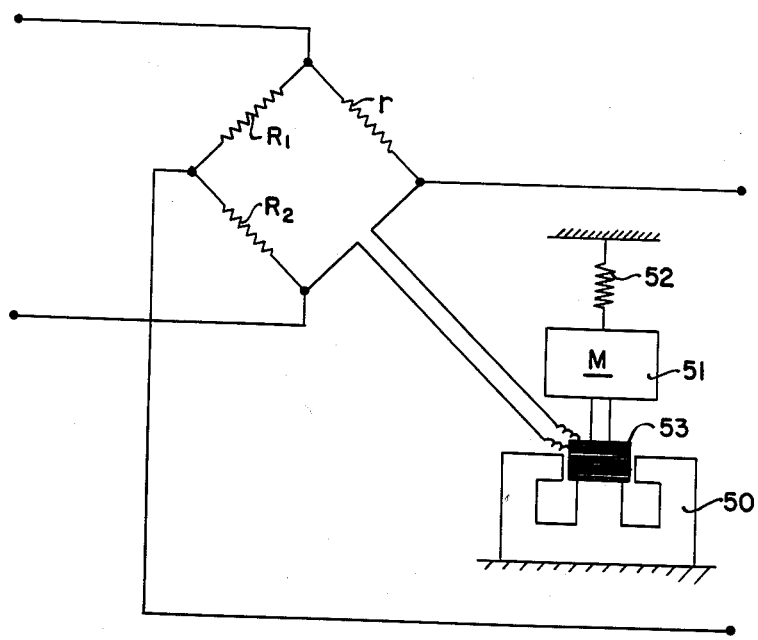

For a further understanding of the present invention and for further objects and advantages thereof, reference may now be had to the following description taken in conjunction with the accompanying drawings in which:

Fig. 1 is a schematic diagram of a recording channel;
Fig. 2 is a graph of amplitude-frequency response and phase-frequency response for the circuit of Fig. 1;
Fig. 3 is a bridge circuit equivalent to a portion of the circuit of Fig. 1;
Fig. 4 is a circle diagram exemplary of the operation of the circuits of Figs. 1 and 3;
Fig. 5 is a plot of variation in phase of the circuits of Figs. 1 and 3 as a function of the value of a selected component thereof;
Fig. 6 is a bridge circuit equivalent to another portion of the circuit of Fig. 1;
Fig. 7 is a circle diagram exemplary of the operation of Figs. 1 and 6;
Fig. 8 illustrates the rate of change of phase angle in the circuits of Figs. 1 and 6; and
Fig. 9 is a modification of Fig. 3.

Referring now to Fig. 1, there is illustrated a seismic recording channel which includes a geophone 10 positioned on the earth for reception of seismic waves. The geophone is connected to an amplifying section which includes an amplifier 11, a filter 12 and an amplifier 13. The amplifiers 11 and 13 may be of any well known type. The elementary high-pass filter 12 is exemplary of the many intricate filter systems employed for selective frequency discrimination and not necessarily limited to high-pass filter, nor to filters comprised of capacitive and inductive elements.

For the purpose of the present description, it will be assumed that the filter network 12 together with all other elements of the signal channel has an amplitude response of the band-pass type. For example, curve 14 of Fig. 2, wherein amplitude of the signal transmitted to the amplifier 13 for a constant amplitude input is plotted as a function of frequency, illustrates such an amplitude-frequency response curve.

It is a maxim in the art that systems exhibiting amplitude-frequency selectivity also have variable or non-linear phase-frequency response. The dotted curve 15 generically represents such a phase response. As is well understood by those skilled in the art, the slope of the phase response curve 15 at a given frequency is equal to the time in seconds that said given frequency component will be delayed in passing through the filter network where the phase angle $\beta$ is expressed in radians and the frequency function $\omega$ is in radians per second.

In accordance with the present invention, the phase-frequency response is corrected so as to be linear throughout the pass band of the curve 14, for example, such as the straight line phase curve 16, so that all components of the signal are delayed by the same absolute time for recording in exactly the same phase relation as in the seismic wave driving the geophone. Additionally, there is provided means for changing or shifting the curve 16, for example, to the position occupied by curve 17. This change introduces delay of or shift by a constant phase angle for all frequencies so that the curve 17, when extended to zero frequency, intersects the zero frequency ordinant at a point equal to $\pi$ or an integral multiple thereof. These corrections to the phase-frequency response are accomplished independently of the amplitude-frequency response 14. When such is the case, all frequency components of the signal generated by the geophone 10 are transmitted to the recorder 18 in precisely the same blending in so far as phase is concerned as they appeared in the ground motion they represent. They are distorted only in amplitude and this distortion is controlled by the filter 12.

A suitable circuit for eliminating phase distortion due to the non-linear curve 15 is illustrated in Fig. 1 and includes tube 20, responsive at its input circuit to the output of amplifier 13, tube 21 responsive to the output of amplifier tube 20, and tube 22 in turn responsive to the output of amplifier 21. The circuits are illustrated as following amplifiers 11 and 13. It is obvious that they may be placed at any point in the amplifying channel between its input terminals and its output terminals.

The circuits associated with tubes 20 and 21 are utilized to correct for the curvature of curve 15. The circuit of tube 20 includes a resistance $R_1$ connected between its anode and B+ terminal, the point of connection to B+ being designated as point C. A cathode biasing resistor 23 couples the cathode of tube 20 to the point B and resistor $R_2$ connects point B to ground. A by-pass condenser 24 connected between point C and ground makes point C at ground potential as far as the alternating current signal is concerned. A series circuit interconnects the points A and B and includes a resistor $r$ and a tank circuit T comprised of a condenser 25 and an inductance 26. The point D intermediate the resistance $r$ and the tank circuit T is connected by way of condenser 27 to the input grid of tube 21. The grid of tube 20 is connected by way of grid resistor 28 to the point B. The point C, intermediate resistor $R_1$ and condenser 24, is connected to the B+ terminal of a suitable supply voltage source.

The circuit associated with tube 21 is identical with that of tube 20 except for the values of circuit parameters as will hereinafter be explained.

The circuit associated with tube 22 differs from the foregoing in the components of the series circuit connecting points A and B. In the circuit associated with tube 22, a condenser 30 and a resistor 31 form the series circuit, with the intermediate point D connected by way of condenser 37 to the recorder 18.

The circuits including tubes 20 and 21 are utilized for correcting the curvature of the curve 15 whereas the circuit including tube 22 is utilized for adjusting the zero intercept of the straight line or corrected portion of the curve 16 by shifting it, once it is straight, to a position such as occupied by curve 17. However, it will appear from the following description that fewer or that additional circuits may be utilized. In general, a greater number will be necessary where the selectivity of the signal channel is more pronounced and involves more complexity in the phase response. For the present description, it will be assumed that two such linearity correcting networks are sufficient.

Referring now to Fig. 3, there is illustrated a modification which is the alternating current equivalent of the circuit associated with tube 20. The elements have been given the same reference characters in Figs. 1 and 3. The vector diagram of Fig. 4 is explanatory of the operation of Fig. 3. The points A and B of the bridge network are representative of the signal voltage across anode and cathode of the tube 20. The input voltage $E_{in}$ may be represented by a vector AB, Fig. 4. The sum of the voltages across the resistor $r$ and the tank circuit T will for all frequencies be equal to the voltage AB. It will be recognized that the locus of the voltage across the tank circuit T, i. e., voltage DB, will be the circle 24. To illustrate, assuming pure elements and zero frequency, the inductance 26 exhibits zero impedance so that the voltage DB is zero and the voltage AD is equal to AB. For increasing frequencies the ratio of AD to DB decreases, and the vector DB follows the lower half of circle 24. At resonance of the tank circuit T, the voltage DB is in phase with AB and equal thereto and for higher frequencies, follows the upper half of circle 24.

The output voltage $E_0$ is equal to the vector sum of the voltages across the tank circuit T and resistor $R_2$. As illustrated by Fig. 4, the output voltage $E_0$ represented by vector DC is a vector of constant amplitude which has a phase that varies from 0° to 360° in the frequency range of from zero to infinity. In Fig. 4, the vector DC follows the circle 35. The solid vectors of Fig. 4 represent the phase relation at a frequency above resonance whereas the dotted vectors represent the operation at a frequency slightly below and approaching resonance.

The rate at which the phase angle $\phi$ changes adjacent the resonant point of the tank circuit T is controlled principally by the dissipation in, or the Q of, the resonant circuit. In Figs. 1 and 3, the resistor $r$ controls the dissipation in the resonant circuit extending between A and B. More particularly, in Fig. 5 the phase shift $\beta'$ experienced by a signal applied to the tank circuit T may be expressed as:

$$\beta' = \tan^{-1} r \frac{(X_L - X_C)}{X_L X_C}$$

The phase shift is zero at resonance, that is, where $X_L = X_C$. At frequencies closely adjacent resonance the tangent is proportional to the resistance of the resistor $r$, and since the angles are small they are also substantially proportional to $r$. Therefore, for frequencies close to resonance, the slope of the phase-frequency response of the tank circuit will be proportional to $r$. For frequencies further removed from resonance, this proportionality does not hold but is utilized in the correction of the variation in the curvature of the phase-frequency response of the signal channel. The curves of Fig. 5 illustrate the variation in the phase of a voltage applied to the circuit of Fig. 3 for three values of $r$. The curve having the steepest slope corresponds to the variation in phase for a circuit having a value $r_1$ higher than for the circuit employing lower values for $r_2$ and $r_3$. Since the changes in slope of the portion K of the curves of Fig. 5 are opposite in sign to the change in the slope of the curve 15 of Fig. 2, values of $r$ may be selected such that the curvature of curve 15 may be completely compensated.

The foregoing is utilized in correcting the linearity of the curve 15 of Fig. 2. In practice a first frequency $f_1$ within the pass band of the curve 14 is selected where the difference between the phase-frequency response curve 15 and a straight line 16, tangent to curve 15 below the pass band, is equal to $\pi$. The tank circuit T connected to tube 20, Fig. 1, or the tank circuit T of Fig. 3 is constructed to be resonant at the selected frequency $f_1$ and the bridge circuit is connected in the signal channel so that the output voltage represented by vector DC is 180° out of phase from the input voltage represented by vector AB of of Fig. 4. The bridge circuit delays the selected frequency $f_1$, Fig. 2, by an amount sufficient to make the total delay for frequency $f_1$ equal to the delay of frequencies at the selected tangent point below the pass band. The resistor $r$, Fig. 3, is then adjusted to control the variation in the phase angle $\phi$, Fig. 4, adjacent the selected frequency $f_1$. In this manner the curve 15, Fig. 2, is corrected so that it is substantially linear, coinciding with the straight line 16 from below frequency $f_1$ to slightly above frequency $f_1$.

With the curve thus corrected, a second frequency $f_2$ is selected where the difference between curve 15 after the above initial correction and the curve 16 is equal to $\pi$. In the manner above described, the tank circuit T connected to tube 21 is resonated at frequency $f_2$ and the associated resistor $r$ adjusted to correct the curve for linearity to beyond the pass band.

In more complex cases a plurality of circuits such as in Fig. 3 or circuits such as associated with tubes 20 and 21 of Fig. 1 may be required. However, by resonating the tank circuits at the frequencies selected and by selecting the proper value of resistance as above indicated, the phase response may be made to be linear although the amplitude response may exhibit a broader pass band or greater selectivity than curve 14.

When the phase response has been corrected to be linear, the circuit associated with the tube 22 may be utilized to alter the zero frequency intercept of curve 16 so that it assumes a new position in which the extension of the straight line portion of the curve to zero frequency intersects the zero frequency ordinate at a multiple of $\pi$. It will be noted in Fig. 2 that curve 16 does not intersect the zero frequency ordinate at $\pi$ so that if a system were utilized with this curve controlling, all the frequencies would be delayed by a time interval equal to the slope of the curve 16 plus a portion of a cycle of each frequency. The latter "portion of a cycle" would be dependent upon the distance between the intercept of the curve 16 at zero frequency and the $\pi$ of next higher integer. The latter increment would result in phase distortion and only where the zero frequency intercept is at zero, $\pi$ or a multiple thereof will there be absence of phase distortion.

In Fig. 6 there is illustrated a bridge network corresponding with the circuit associated with tube 22 of Fig. 1. It is similar in principle and operation to the circuit of Fig. 3 except that the maximum phase shift from zero frequency to infinite frequencies is 180°. By proper selection of the resistor 31 and the condenser 30, all frequencies will be delayed by an equal phase angle. This is illustrated by Figs. 7 and 8. In Fig. 7 it is shown that the locus of the vector DB across resistance 31 is a semicircle 40 and the locus of the vector sum of DB and BC is a semicircle 41 so that the voltage D. C., i. e., the output voltage $E_0$, varies in phase, with respect to the input voltage, through 180° and is independent of or does not affect amplitude. The value of resistance 31 determines how rapidly the phase angle $\phi'$ approaches 180°. Phase variations for three values of $r$ are plotted in Fig. 8. Within the pass band arbitrarily defined in Fig. 8 by $\omega_1$ and $\omega_2$, the phase variation is linear so that a constant phase shift for all frequencies in the pass band is introduced.

In seismic exploration the instrumentalities utilized are required to be versatile and interchangeable for operation under the varied conditions encountered in different localities. One type geophone may be suitable for work in one area, whereas an entirely different type geophone would be required for others. Geophones in general have a non-linear phase-frequency response since they are mechanical systems having resonance associated therewith. The recorder 18 including galvanometers of types well known in the art may also introduce phase distortion. The circuits including tubes 20—22 may be utilized after an entire recording channel has been assembled to correct, in one unit, the overall phase-frequency response of the channel. Alternatively it may be preferable in the interest of providing interchangeability of units to provide a network of the type illustrated in Fig. 3 for correction of the linearity of the geophone response alone. A similar phase correcting network would then be provided for the amplifier section including amplifier 11, filter 12 and amplifier 13. To make the system complete and the phase response linear, a separate linearity corrector would be provided for recorder 18. Thus, once units provided with phase linearity correction circuits are assembled, a single circuit of the type associated with tube 22 and operatively illustrated by Figs. 6–8 may be utilized to correct the zero frequency intercept of the entire channel.

In accordance with the foregoing, the amplitude response of the channel principally as modified by the filter 12 may be selected without limitation with respect to the relationship between the width and center frequency of the pass band. Once the amplitude response is determined, the associated circuits may be provided as above described for correcting any curvature in the phase response and for adjusting the intercept.

From a practical viewpoint it has been found necessary, in order to meet varying conditions in the field, to provide from as many as three or four to twenty or more different filter combinations for a corresponding number of amplitude responses. Each amplitude-frequency response has a unique phase characteristic associated therewith that must be corrected for linearity and intercept if the record is to be produced free of phase distortion. Further, if records produced by using various filter settings are to be readily correlated one with another, the absolute time delay for all frequencies passing therethrough should be the same for all filter settings. Therefore, not only should the curve be straight throughout the pass band and intersect the zero frequency ordinate at $\pi$, but the phase-frequency response for all should have the same slope for all filter settings and similarly should have the same zero frequency intercept.

In accordance with the present invention as illustrated in Fig. 1, the resistors $r$, the condensers 25 and the resistor 31 may be changed either simultaneously with or independently of changes in the components of the filter 12. In either case, the phase-frequency response associated with the filter is corrected for linearity and the resistor 31 is selected to have a value such that the phase response when linear has exactly the same slope and zero frequency intercept as for all other filter settings. In this manner the absolute time delay is constant not only for frequencies passing through a single filter but for the frequencies passing through all filters that may be utilized in the difficult undertaking of seismically exploring varied formations.

Fig. 9 illustrates a system that is mechanically resonant and may be damped by friction or by means other than the variation in the resistance element $r$ of Fig. 1. More particularly, the mechanically resonant means of Fig. 9 includes a magnetic structure 50 having associated therewith mass 51 suspended by a spring 52. A coil 53 carried by the mass 51 is positioned in a flux threaded air gap of the magnet 50. By selecting the mass 51 and the spring 52 for resonance at the desired frequency in the pass band of the amplifier, a resonance phenomena similar in nature to that above described with respect to the tank circuit T of Fig. 3 takes place. Thus, the coil 53 may be substituted in the bridge circuit of Fig. 3 for the tank circuit T and the mechanically resonant system provides the required phase relations. Either electrical damping by means of variation of the resistance $r$ or mechanical damping as by dash pots or other means known in the art may be used to vary the rate of change of the phase angle at or near the resonant point in order to fit curve 15 to the straight line 16.

Thus in accordance with the foregoing it will be seen that the effect of a non-linear phase-frequency response associated with a seismic filter system is eliminated by delaying each frequency in the pass band of the amplifier by a phase angle equal to the difference between the phase-frequency response of the amplifier at each frequency and a straight line tangent to the phase-frequency response at a frequency at the lower end of or below the band. When the phase-frequency response is linear throughout the pass band, all frequencies are transmitted through the channel with the same absolute time delay. In order to provide the same blending of the components of the signal as detected by the associated geophone, in so far as phase is concerned, all frequencies in the pass band are then delayed or shifted by the same phase angle, the latter angle being equal to the difference between the zero frequency intercept of the straight line and the next higher multiple of $\pi$ at zero frequency.

While modifications of the invention have been illustrated and described it will be understood that further modifications may now suggest themselves to those skilled in the art and it is intended to cover such modifications as fall within the scope of the appended claims.

What is claimed is:

1. A signal channel having input terminals and output terminals, circuit elements between said terminals connected to form a filter for transmission to said output terminals of a band of selected frequencies of the signal applied to said input terminals and for rejecting other frequencies, said filter having a non-linear phase-frequency response characteristic, circuit means between said terminals resonant at a first frequency in the non-linear portion of said phase-frequency response characteristic for modifying said phase-frequency response characteristic by a selected increment at said first frequency, means associated with said circuit means for controlling the rate of variation of the modification of said phase-frequency response characteristic at frequencies adjacent said first frequency to eliminate curvature of said phase-frequency response characteristic at and adjacent said first frequency and a corrective network between said terminals introducing a phase angle correction of magnitude constant for all frequencies of said band for controlling the zero-frequency intercept of the portion of said phase-frequency response characteristic at and adjacent said first frequency.

2. A signal channel having input terminals and output terminals, circuit elements between said terminals comprising a band pass filter for transmission to said output terminals of selected frequencies of the signal applied to said input terminals and for rejecting other frequencies, said filter having a non-linear phase-frequency response characteristic through the pass band, circuit means between said terminals resonant at a first frequency in the non-linear portion of said phase-frequency response characteristic where the phase angle between said phase-frequency response characteristic and a tangent to said phase-frequency response characteristic below said pass band is equal to $\pi$, means associated with said circuit means for controlling the rate of variation of the modification of said phase-frequency response characteristic at frequencies adjacent said first frequency for producing a modified phase-frequency response characteristic substantially coinciding with said tangent, and means between said terminals for phase-correcting all frequencies within said pass band by the same phase angle for controlling the zero frequency intercept of the portion of said phase-frequency response characteristic in said pass band.

3. A signal channel having input terminals and output terminals, circuit elements between said terminals comprising a band pass filter for transmission to said output terminals of selected frequencies of the signal applied to said input terminals, said filter having a non-linear phase-frequency response characteristic in said pass band, a circuit resonant at a first frequency in said pass band where the phase angle between said phase-frequency response characteristic and a tangent to said phase-frequency response characteristic below said pass band is equal to $\pi$, means for varying the Q of said resonant circuit for controlling the rate of variation of the modification of said phase-frequency response characteristic at frequencies adjacent said first frequency to eliminate curvature of said phase-frequency response characteristic at and adjacent said first frequency, and means between said terminals for controlling the zero frequency intercept of the portion of said phase-frequency response characteristic at and adjacent said first frequency without changing the slope thereof.

4. A signal channel having input terminals and output terminals, circuit elements between said terminals defining a filter for transmission to said output terminals of selected frequencies of the signal applied to said input terminals and for rejecting other frequencies characterized by a non-linear phase-frequency response characteristic, a bridge network connected in said signal channel and having in one arm thereof a circuit resonant at a first frequency in the non-linear portion of said phase-frequency response characteristic for modifying said phase-frequency response characteristic by a selected increment at said first frequency, a resistance in an arm of said bridge adjacent said resonant circuit for varying the Q of said bridge network to control the rate of change of variation of the modification of said phase-frequency response characteristic at frequencies adjacent said first frequency to eliminate curvature of said phase-frequency response characteristic at and adjacent said first frequency, and means between said terminals for controlling the zero frequency intercept of the portion of said phase-frequency response characteristic at and adjacent said first frequency.

5. A signal channel having input terminals and output terminals, circuit elements between said terminals defining a filter for transmission of said output terminals of selected frequencies of the signal applied to said input terminals and for rejecting other frequencies characterized by a non-linear phase-frequency response characteristic, circuit means between said terminals resonant at a first frequency in the non-linear portion of said phase-frequency response characteristic for modifying said response characteristic by a selected increment at said first frequency, damping means associated with said resonant circuit for controlling the rate of variation of the modification of said phase-frequency response characteristic at frequencies adjacent said first frequency to eliminate curvature of said phase-frequency response characteristic at and adjacent said first frequency, a bridge network connected between said terminals having a capacitive reactance and resistance in adjacent arms thereof, and means for adjusting the relative values of the impedance in said adjacent arms for controlling the zero frequency intercept of the portion of said phase-frequency response characteristic at and adjacent said first frequency.

6. A signal channel having input terminals and output terminals, circuit elements between said terminals defining a filter for transmission to said output terminal of selected frequencies of the signal applied to said input terminals and for rejecting other frequencies characterized by a non-linear phase-frequency response characteristic, a first bridge network connected in said signal channel having in one arm thereof means resonant at a first frequency in the non-linear portion of said phase-frequency response characteristic for modifying said phase-frequency response characteristic by a selected increment at said first frequency, damping means associated with said resonant means for varying the Q of said bridge network to control the rate of change of variation of the modification of said phase-frequency response characteristic at frequencies adjacent said first frequency to eliminate curvature of said phase-frequency response characteristic at and adjacent said first frequency, a second bridge network connected in said channel having a capacitive reactance and resistance in adjacent arms connected across the input terminals of said bridge network, and means for varying the ratio of said resistance and reactance for controlling the zero frequency intercept of the portion of said phase-frequency response characteristic at and adjacent said first frequency.

7. A signal channel having input terminals and output terminals, circuit elements between said terminals defining a band pass filter for transmission to said output terminals of selected frequencies of the signal applied to said input terminals and for rejecting other frequencies characterized by non-linear phase-frequency response characteristic through the pass band, a first phase correcting circuit connected between said terminals resonant at a first frequency in the said pass band where the phase angle between said phase-frequency response characteristic and a tangent to said phase-frequency response characteristic below said pass band is equal to $\pi$, means associated with said first phase correcting circuit for controlling the rate of variation of the modification of said phase-frequency response characteristic at frequencies adjacent said first frequency for producing a modified phase-frequency response characteristic substantially linear in the range of said first frequency, a second phase correcting circuit connected between said terminals resonant at a second frequency in the non-linear portion of said modified phase-frequency response characteristic where phase angle between said modified phase-frequency response characteristic and said tangent is equal to $\pi$, means associated with said second phase correcting circuit for controlling the rate of variation of the modification at frequencies adjacent said second frequency, and means between said terminals for phase-correcting all frequencies within said pass band by the same phase angle for controlling the zero frequency intercept of the portion of said phase-frequency response characteristic in said pass band.

8. In seismic surveying where a selected band from a spectrum of electrical signals generated in response to seismic waves arriving at a receiving station is transmitted to recording apparatus, the method of eliminating the effect of a non-linear phase-frequency response characteristic of the transmitting system associated with selection of said band which comprises delaying each frequency in said band by a phase angle equal to the difference between the phase-frequency response characteristic at each frequency and a straight line tangent to said phase-frequency response characteristic at a frequency at the lower end of said band, and phase-correcting all frequencies in said band by a phase angle equal to the difference between the zero frequency intercept of said straight line and the next higher multiple of $\pi$ at zero frequency.

9. A signal channel having input terminals and output terminals, a filter network between said terminals for transmission to said output terminals of a band of selected frequencies of the signal applied to said input terminals and for rejecting other frequencies, said filter network having a non-linear phase-frequency response characteristic, a linearity-producing corrective network between said input and said output terminals including at least two parallel branches, only one of which includes inductive and capacitive circuit components establishing resonance in their branch at a frequency where the difference between the phase-frequency response characteristic of said filter and a straight line tangent to said characteristic in a region below the pass band is equal to $\pi$, the remaining components of said corrective network being resistive and producing from the input voltage an output voltage uniform in amplitude and variable in phase in correction of said non-linear characteristic, and a second corrective network between said terminals including circuit components of resistive and capacitive elements only for introducing a phase-correction of a constant phase angle for all frequencies of said band and for establishing a zero-frequency intercept for the corrected phase-frequency response characteristic at and adjacent said resonant frequency.

10. The combination set forth in claim 9 in which circuit components of said filter and of said corrective networks are adjustable, and means for adjusting said filter to vary the pass band thereof and for concurrently adjusting said corrective networks to maintain linearity of said output voltage.

11. A signal channel having input terminals and output terminals, a filter network between said input and output terminals for transmission to said output terminals of a band of selected frequencies of the signal applied to said input terminals and for rejecting other frequencies, said filter having a non-linear phase-frequency response characteristic, a corrective network between said input terminals and said output terminals for modifying said phase-frequency response characteristic comprising circuit components in a first branch of said corrective network establishing resonance at a frequency within the pass band of said filter where the difference betwen said phase-frequency response characteristic and a straight line tangent to said phase-frequency response characteristic below said pass band is equal to $\pi$, a second branch of said network including a resistive circuit component, said first and second branches of said network terminating at said input terminals for development across them of two voltage components of the signal voltage applied to said input terminals, third and fourth branches of said corrective network comprising resistive circuit components for development of vectorial signal components for producing from the input voltage an output voltage of uniform amplitude but variable in phase, and a four-terminal corrective network between said terminals introducing a phase-correction of a constant phase angle for all frequencies of said band for controlling the zero-frequency intercept of the portion of said phase-frequency response characteristic at and adjacent said resonant frequency.

12. The combination set forth in claim 11 in which circuit components of said filter and of said corrective networks are adjustable, and means for adjusting said filter to vary the pass band thereof and for concurrently adjusting said corrective networks to maintain linearity of said output voltage.

References Cited in the file of this patent

UNITED STATES PATENTS

| | | |
|---|---|---|
| 1,638,536 | Kupfmuller | Aug. 9, 1927 |
| 1,709,037 | Pero | Apr. 16, 1929 |
| 1,944,297 | Nyquist | Jan. 23, 1934 |
| 2,246,307 | Krist | June 17, 1941 |
| 2,346,369 | Eisler | Apr. 11, 1944 |
| 2,567,380 | Kingsbury | Sept. 11, 1951 |

FOREIGN PATENTS

| | | |
|---|---|---|
| 712,006 | France | July 8, 1931 |